(12) United States Patent
Sako et al.

(10) Patent No.: US 6,169,803 B1
(45) Date of Patent: Jan. 2, 2001

(54) ENCRYPTION KEY PROCESSING SYSTEM TO BE INCORPORATED INTO DATA RECOVERY SYSTEM OR KEY SETTING SYSTEM FOR GENERATING ENCRYPTION KEY

(75) Inventors: Kazue Sako; Hiroshi Miyauchi, both of Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/013,223

(22) Filed: Jan. 26, 1998

(30) Foreign Application Priority Data

Jan. 24, 1997 (JP) .................................................. 9-010797
Jan. 24, 1997 (JP) .................................................. 9-010798

(51) Int. Cl.$^7$ ........................................................ H04L 9/02
(52) U.S. Cl. ............................ 380/44; 380/200; 380/201; 705/16
(58) Field of Search .................... 380/1, 4, 21, 200, 380/201; 365/185.01; 705/16

(56) References Cited

U.S. PATENT DOCUMENTS

| | | | |
|---|---|---|---|
| 4,747,050 | * | 8/1987 | Brachtl et al. ...................... 364/408 |
| 5,557,346 | | 9/1996 | Lipner et al. . |
| 5,557,765 | | 9/1996 | Lipner et al. . |
| 5,600,720 | * | 7/1994 | Iwamura .................................. 380/1 |
| 5,724,425 | * | 3/1998 | Chang et al. .......................... 380/25 |

FOREIGN PATENT DOCUMENTS 8506217   7/1996   (JP) .

OTHER PUBLICATIONS

Japanese Unexamined Patent Publication (Kokai) No. Heisei 3–16339 (referred to as "Article 5" in the specification).

Japanese article entitled "File Key Management Using Public Key Encryption" (referred to as Article 4 in the specification).

* cited by examiner

Primary Examiner—Tod R. Swann
Assistant Examiner—Todd Jack
(74) Attorney, Agent, or Firm—Sughrue, Mion, Zinn, Macpeak & Seas, PLLC

(57) ABSTRACT

An encryption key processing system includes a user terminal system which uses a key and a sub-system for holding information regarding the user terminal system, the sub-system generating predetermined public information, secret information corresponding to the public information and a secret key dependent on an identifier of said user terminal system, sending a secret key to the user terminal system in secret and the user terminal system generating and using a key and necessary information based on a secret key and public information received from the sub-system.

9 Claims, 12 Drawing Sheets

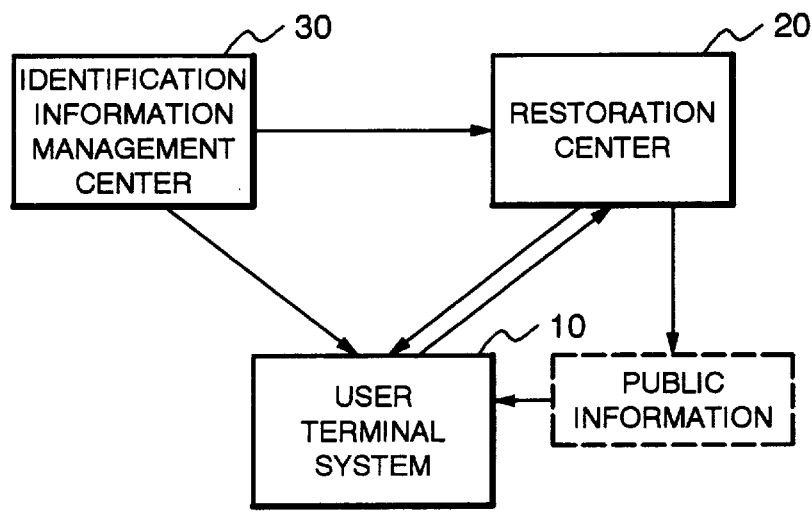
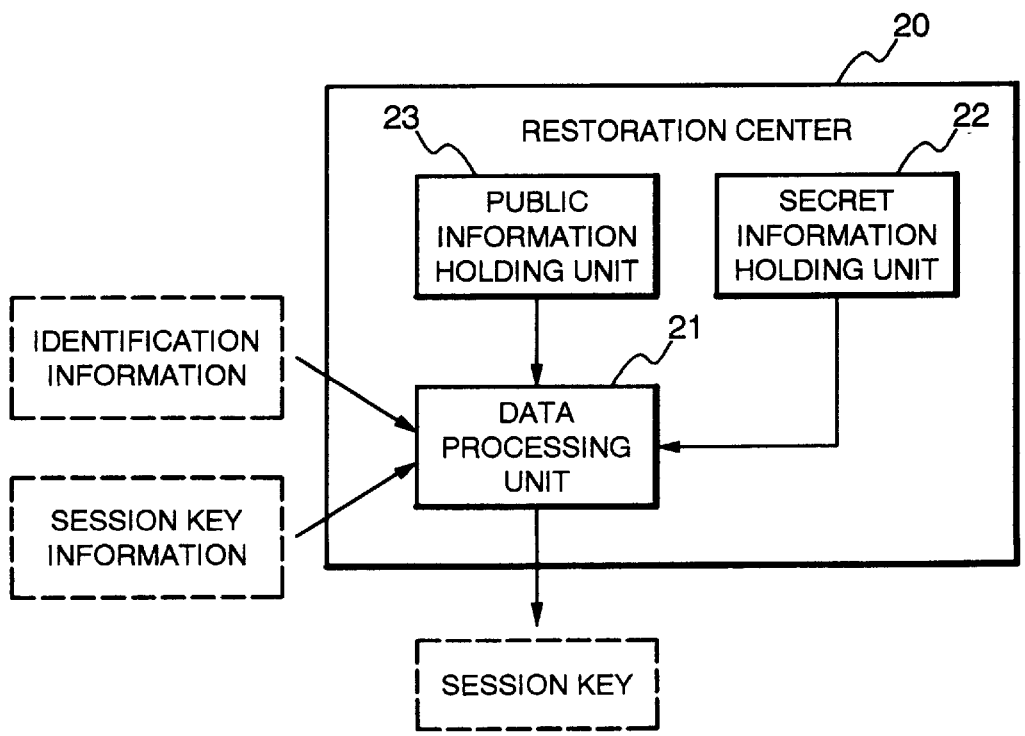

ENCRYPTION KEY PROCESSING SYSTEM TO BE INCORPORATED INTO DATA RECOVERY SYSTEM OR KEY SETTING SYSTEM FOR GENERATING ENCRYPTION KEY

BACKGROUND OF THE INVENTION

1. Field of the Invention

The present invention relates to an encryption key processing system for generating an encryption key for use in encipherment of data and, more particularly, to an encryption key processing system which can be incorporated into a data recovery system capable of restoring enciphered data even when a user loses a key or into a key setting system which sets a key for use in the data recovery system, as well as saving secret information related to the set key in a plurality centers.

2. Description of the Related Art

Among conventional data recovery systems which restore enciphered data by using a specific key are those disclosed in International Publication No. WO 93/21708, entitled "VERIFYING SECRET KEYS IN A PUBLIC-KEY CRYPTOSYSTEM" (Article 1), U.S. Pat. No. 5,557,346, entitled "SYSTEM AND METHOD FOR KEY ESCROW ENCRYPTION" (Article 2), U.S. Pat. No. 5,557,765, entitled "SYSTEM AND METHOD FOR DATA RECOVERY" (Article 3) and the literature "File Key Management Using Public Key Encryption" (Kazutoyo Kurita and Hiroshi Miyauchi, 47th National Conference of Japanese Society of Information Processing Engineers of Japan, April 1978) (Article 4).

These conventional data recovery systems provide a means for coping with user's loss of a session key. In the system disclosed in Article 1, for example, each user divisionally provides consignees with his secret key, so that when the user loses a session key, the user terminal system is allowed to obtain the secret key from the consignee to restore the session key. On the other hand, in the system disclosed in Article 2, a user enciphers his own session key and his own identification information by a public key of a center and stores the enciphered key and information, so that when the user loses the session key, he has the enciphered data decoded by the center by using the enciphered session key and identification information. For excluding other's request for decoding of enciphered data, when the center decodes enciphered data, the system is allowed to present a decoding result after confirming that the user's identification information appears in a decoded text.

The conventional technique recited in Article 1, however, needs numerous management steps because a secret key of each user is saved in a plurality of centers.

On the other hand, the conventional technique recited in Article 4 needs another management mechanism for excluding overlap of identification information and seizing a corresponding relationship between identification information and an actual individual because the user's identification information is not authorized, which results in making the system structure complicated.

In addition, the system recited in Article 1 in which a user divisionally provides a plurality of consignees with his secret key requires each user to follow lodging procedures by himself so as to enable a consignee to verify that the user properly divides his own secret key. This makes the procedures troublesome. When encryption communication is conducted by using this system, for example, a user will generate a public key and a secret key based on secret information issued from a key management center and provide a consignee with the secret key.

Moreover, with the system, all the centers might restore a user's secret key and use the key for other purpose in conspiracy with each other.

Conventional encryption communication technique is recited, for example, in Patent Laying-Open (Kokai) No. Heisei 3-16339, entitled "Encryption Key Delivery System" (Article 5). Article 5 recites a key deliver system in which each sub-system generates and delivers a key delivery code of an encryption key by using identification information assigned to each system and secret information dependent on the identification information, while a sub-system as a receiver of the key delivery code generates the same encryption key by using the identification information of the sub-system as a sender and secret information of the own system, thereby enabling key delivery by one-way communication from a sender to a receiver, while preventing false use of keys by the alteration of public information.

SUMMARY OF THE INVENTION

An object of the present invention is to provide an encryption key processing system realizing a data recovery system capable of unifying secret information managed by a restoration center, as well as excluding a request for restoration from a false user with ease.

Another object of the present invention is to provide an encryption key processing system realizing a key setting system in which a key management center issues secret information divisionally at the time of key setting to eliminate user's need to follow lodging procedures.

According to one aspect of the invention, an encryption key processing system for generating an encryption key for use in enciphering data, comprises a user terminal system which uses a key, and a sub-system for holding information regarding the user terminal system, the sub-system generating predetermined public information, secret information corresponding to the public information and a secret key dependent on an identifier of the user terminal system and sending the secret key to the user terminal system in secret, and the user terminal system generating and using a key and necessary information based on the secret key and the public information received from the sub-system.

In the preferred construction, the user terminal system comprises key generation means for generating a key and key information by using an appropriate random number, the secret key and the public information, data processing means for enciphering and decoding data by using a key generated by the key generation means, and storage means for storing key information generated by the key generation means and enciphered data enciphered by the data processing means together, and the sub-system comprises key restoration means for restoring a key of the user terminal system based on the key information, the secret information and an identifier of the user terminal system when necessary.

In the preferred construction, the user terminal system comprises key generation means for generating a key and key information by using an appropriate random number, the secret key and the public information, encipherment means for enciphering a key for storage arbitrarily set by using a key generated by the key generation means, as well as generating information of the key for storage, data processing means for enciphering and decoding data by using a key for storage enciphered by the encipherment means, and storage means for storing key information generated by the key generation means, key for storage information generated by the encipherment means and enciphered data enciphered by the data processing means together, and the sub-system comprises key restoration means for restoring a key of the user terminal system based on the key information, the secret information and an identifier of the user terminal system when necessary.

In the preferred construction, the user terminal system comprises key generation means for generating a key and key information by using an appropriate random number, the secret key and the public information, encipherment means for enciphering an encryption key for communication set for enciphering a communication between specific user terminal systems by using a key generated by the key generation means, as well as generating information of the encryption key for communication, data processing means for enciphering and decoding data by using a key for storage enciphered by the encipherment means, and storage means for storing key information generated by the key generation means, key for storage information generated by the encipherment means and enciphered data enciphered by the data processing means together, and the sub-system comprises key restoration means for restoring a key of the user terminal system based on the key information, the secret information and an identifier of the user terminal system when necessary.

In another preferred construction, the encryption key processing system further comprises a plurality of secret information holding sub-systems for dispersively holding the secret information generated by the sub-system, wherein the user terminal system comprises key generation means for generating a key and key information by using an appropriate random number, the secret key and the public information, data processing means for enciphering and decoding data by using a key generated by the key generation means, and storage means for storing key information generated by the key generation means and enciphered data enciphered by the data processing means together, and the sub-system comprises key restoration means for restoring a key of the user terminal system based on the key information, the secret information dispersively held by the plurality of secret information holding sub-systems and an identifier of the user terminal system when necessary.

In another preferred construction, the sub-system comprises a first sub-system including means for generating the secret key, means for generating intermediate information for generating the public information and the secret information of its own system, and means for sending the secret information and the secret key to the user terminal system in secret, and a second sub-system including means for generating public information dependent on the intermediate information generated by the first sub-system and the secret information of its own system, mean for making the public information public, and means for sending the secret information to the user terminal system in secret, and the user terminal system comprises secret information generation means for generating user secret information for use in the generation of the key based on the secret information and the secret key generated by the first sub-system, the secret information generated by the second sub-system and the public information.

In another preferred construction, the sub-system comprises a first sub-system including means for generating the secret key, means for generating intermediate information for generating the public information and the secret information of its own system, and means for sending the secret information and the secret key to the user terminal system in secret, and a second sub-system including means for generating public information dependent on the intermediate information generated by the first sub-system and the secret information of its own system, mean for making the public information public, and means for sending the secret information to the user terminal system in secret, and the user terminal system comprises secret information generation means for generating user secret information for use in the generation of the key based on the secret information and the secret key generated by the first sub-system, the secret information generated by the second sub-system and the public information, and wherein when necessary, the first sub-system processes intermediate key information dependent on an identifier of the user terminal system by using the secret information and the second sub-system processes the intermediate information processed by the first sub-system by using the secret information, thereby restoring the user secret information.

In another preferred construction, the sub-system comprises a first sub-system including means for generating the secret key, means for generating intermediate information for generating the public information and the secret information of its own system, and means for sending the secret information and the secret key to the user terminal system in secret, a second sub-system including means for generating public information dependent on the intermediate information generated by the first sub-system and the secret information of its own system, mean for making the public information public, and means for sending the secret information to the user terminal system in secret, and a third sub-system inserted between the first sub-system and the second sub-system and including means for generating new intermediate information dependent on the intermediate information generated by the first sub-system and the secret information of its own system, and means for sending the secret information to the user terminal system in secret, the public information generation means of the second sub-system generating the public information based on new intermediate information generated by the third sub-system, and the user terminal system comprises secret information generation means for generating user secret information for use in the generation of the key based on the secret information and the secret key generated by the first sub-system, the secret information generated by the second sub-system and the public information.

Also, the third sub-systems are provided in plural and each generates new intermediate information based on intermediate information generated by an immediately preceding sub-system in a predetermined order, and the public information generation means of the second sub-system generates the public information based on new intermediate information generated by the third sub-system located immediately preceding to the second sub-system.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 1 is a block diagram showing structure of a first embodiment in which an encryption key processing system of the present invention is used in a data recovery system.

FIG. 3 is a block diagram showing structure of a restoration center according to the present embodiment.

DESCRIPTION OF THE PREFERRED EMBODIMENT

Figure 2:
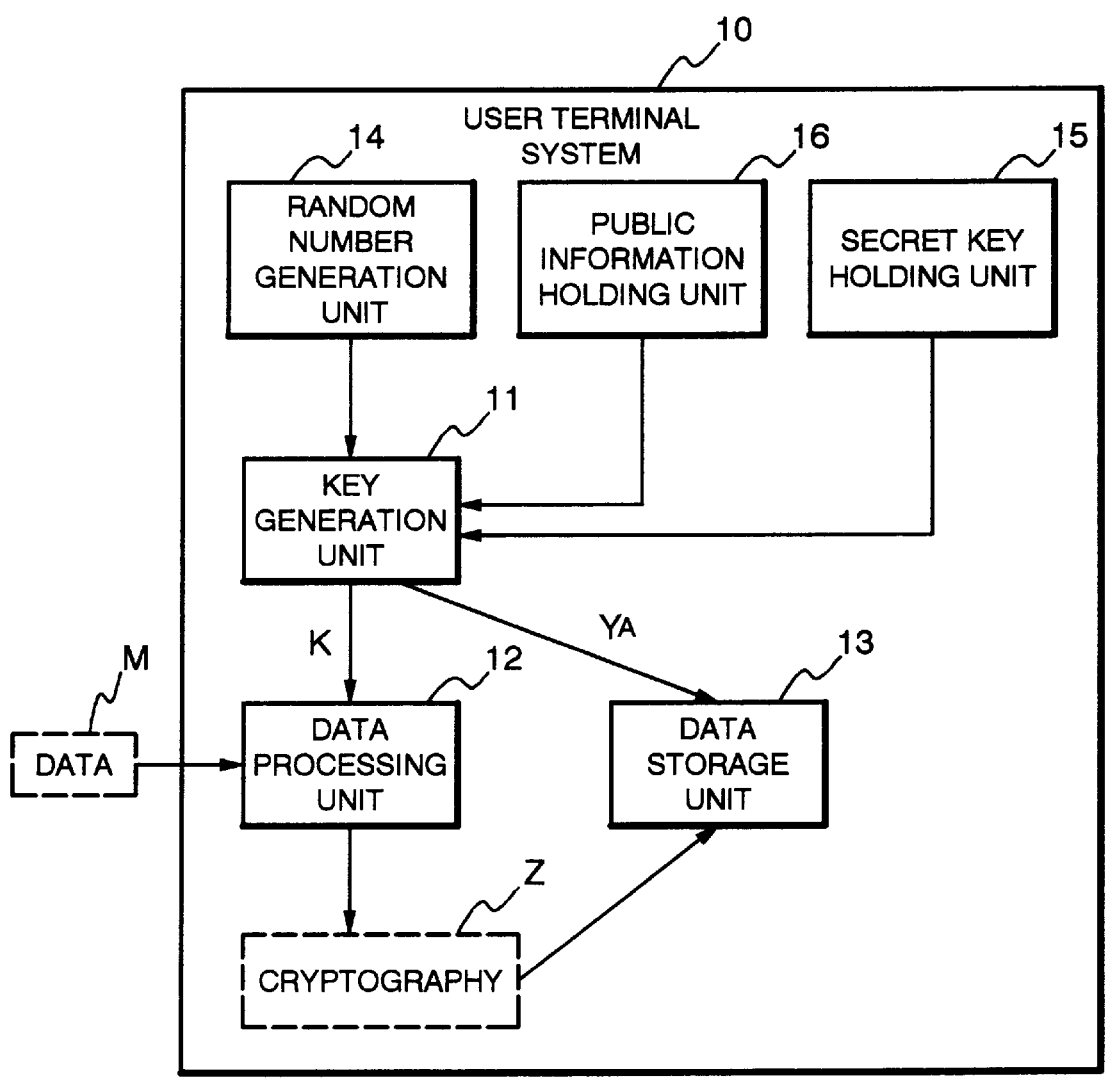
FIG. 2 is block diagram showing structure of a user terminal system according to the present embodiment.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

An encryption key processing system of the present invention includes a user terminal system and a sub-system which holds information regarding the user terminal system, in which system the sub-system generates a secret key dependent on identification information of the user terminal system and predetermined public information and the user terminal system generates necessary information including a session key by using the secret key and the public information. Such an encryption key processing system can be incorporated for use into a data recovery system and a key setting system as will be described in the following.

Description will be first given of an embodiment in which the encryption key processing system of the present invention is used in a data recovery system. The data recovery system of the present embodiment generates a session key and session key information from a secret key dependent on identification information of a user terminal system and from public information of a restoration center and needs identification information of the user terminal system when restoring the session key from the session key information at the restoration center.

FIG. 1 is a block diagram showing structure of a data recovery system according to a first embodiment of the present invention. The data recovery system shown in FIG. 1 includes a user terminal system 10 which generates and uses a session key, a restoration center 20 for restoring a session key of the user terminal system 10 when necessary, and an identification information management center 30 for assigning identification information and secret information dependent on the identification information to the user terminal system 10 and the restoration center 20. Although in FIG. 1, only one user terminal system 10 is illustrated, description will be made on the assumption that a plurality of the user terminal systems 10 ordinarily exist. In the following description, illustration of the user terminal system 10($i$) will individually indicate the plurality of the user terminal systems 10 for convenience.

Operation of the data recovery system of the present embodiment includes three phases, initialization phase, encryption phase and restoration phase. The initialization phase is for the operation of generating and distributing identification information and secret information of the user terminal system 10 and the restoration center 20 and predetermined public information, which operation is conducted by the identification information management center 30 and the restoration center 20. The encryption phase is for the operation of generating a session key and enciphering data by using a session key, which operation is conducted by the user terminal system 10. The restoration phase is for the operation of restoring a session key of the user terminal system 10, which operation is conducted by the restoration center 20 at the request of the user terminal system 10.

Figure 4:
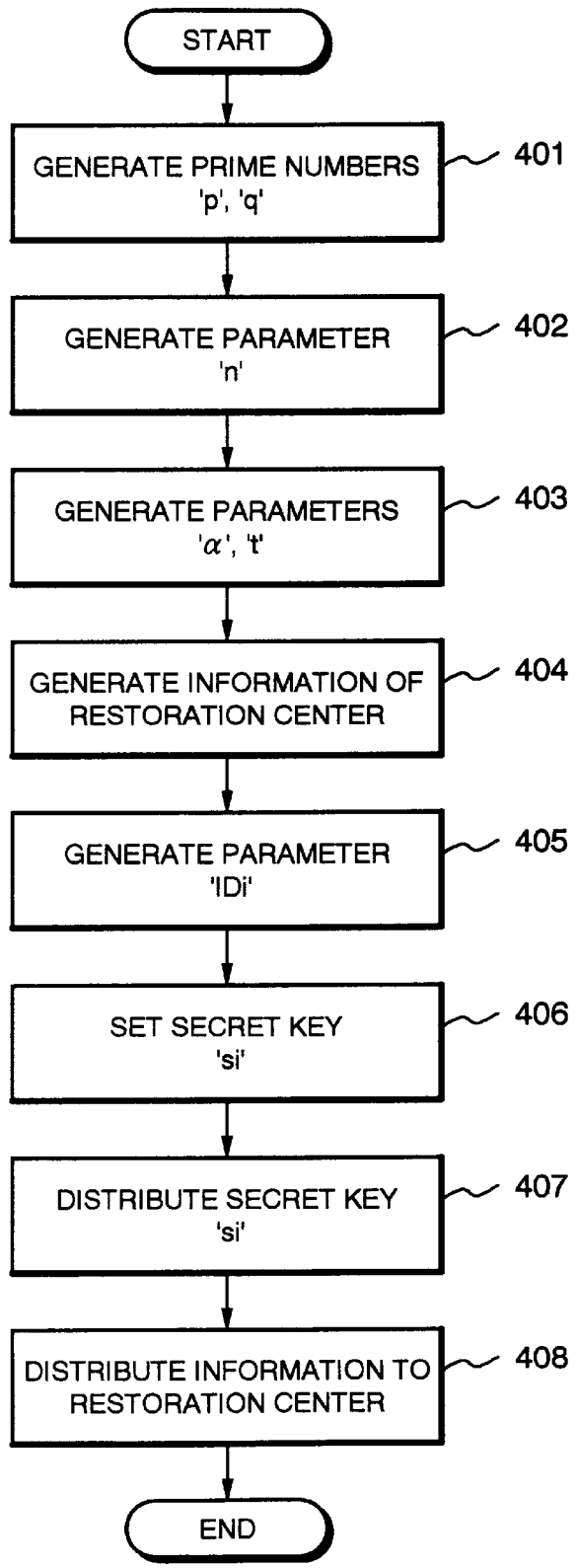
FIG. 4 is a flow chart showing operation by an identification information management center according to the present embodiment.

The identification information management center 30, which is implemented by a computer system such as a workstation or a personal computer, generates and assigns identification information and secret information dependent on the identification information of the user terminal system 10 and the restoration center 20. The center 30 also generates a predetermined parameter. With reference to the flow chart shown in FIG. 4, operation of the identification information management center 30 will be more specifically described. With reference to FIG. 4, the identification information management center 30 first selects large prime numbers 'p' and 'q' (Step 401) to generate a parameter 'n(=p*q)' (Step 402). Next, the center 30 selects a parameter 't' which is mutually prime with '(p−1) (q−1)' and a parameter 'α', a positive integer less than 'n' which will be a primitive element in GF(p) and GF(q) (Step 403). Then, the center 30 determines identification information '$ID_c$' of the restoration center 20, and further, it generates a secret key '$s_c$' according to the following expression (1) using the identification information 'ID$_c$' (Step 404).

$$s_c = (ID_c)^{-\frac{1}{t}} \bmod n \qquad (1)$$

In the above expression, (a mod b) denotes a remainder of the division of a by b. Next, the center 30 determines 'ID$_i$' for each user terminal system 10($i$) (Step 405). Each identification information 'ID$_i$' and the identification information 'ID$_c$' of the restoration center 20 are set so as not to overlap with each other. Then, using the identification information 'ID$_i$', the center 30 generates a secret key 's$_i$' according to the following expression (2) (Step 406).

$$s_i = (ID_i)^{-\frac{1}{t}} \bmod n \qquad (2)$$

Thereafter, the center 30 distributes thus generated identification information 'ID$_i$' and secret key 's$_i$' to each user terminal system 10($i$) (Step 407). In addition, the center 30 distributes the parameters 'n', 't', '$\alpha$', 'ID$_c$' and 's$_c$' generated at the above steps to the restoration center 20 (Step 408).

The identification information management center 30 is not an essential component of the present invention. For example, the above-described parameters may be set by the restoration center 20 and the identification information 'ID$_i$' and the secret key 's$_i$' of the user terminal system 10 may be distributed to each user terminal system 10, or each user terminal system 10 may determine the identification information 'ID$_i$' and the secret key 's$_i$' according to predetermined rules. In any of the cases, required conditions are that the identification information 'ID$_i$' and 'ID$_c$' of the user terminal system 10 and the restoration center 20 are authorized to guarantee that they do not overlap with each other, and that the secret keys 's$_i$' and 's$_c$' are determined dependent on the identification information 'ID$_i$' and 'ID$_c$' according to the above-described expressions (1) and (2).

The restoration center 20, which is implemented by a computer system such as a workstation or a personal computer, generates and makes public information, as well as restoring a session key of the user terminal system 10 at its request and decoding enciphered data by using a restored session key. FIG. 3 is a block diagram showing structure of the restoration center 20. With reference to FIG. 3, the restoration center 20 includes a data processing unit 21 for generating public information and secret information inherent to the restoration center 20 which will be described later and conducting restoration of a session key and decoding processing of enciphered data, a secret information holding unit 22 for holding generated secret information, and a public information holding unit 23 for holding generated public information. In FIG. 3, illustration is made only of a characteristic part of the structure of the restoration center 20 in the present embodiment and that of the remaining common part is omitted. It is clearly understood that the restoration unit 20 in practice includes a communication means for communicating with the user terminal system 10 and the identification information management center 30, and other component.

Figure 5:
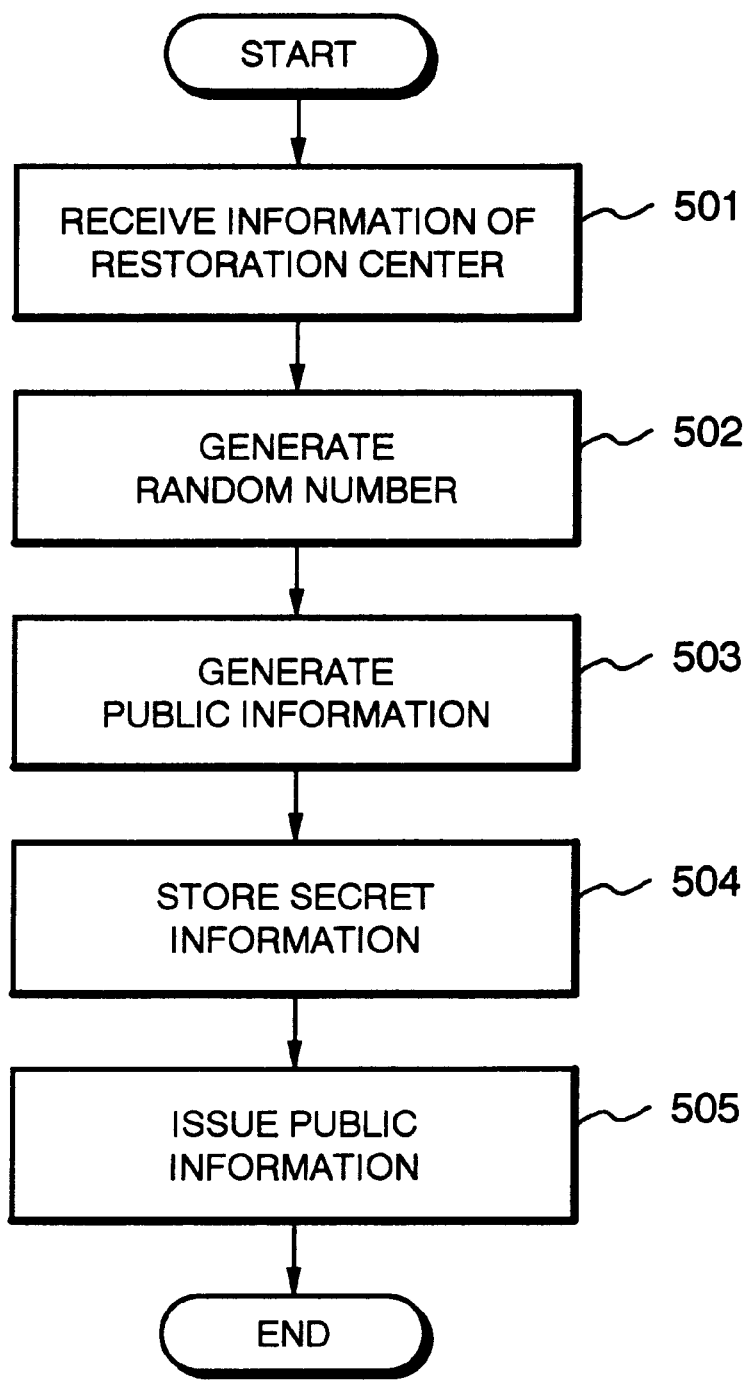
FIG. 5 is a flow chart showing operation by the restoration center of the present embodiment.

With reference to the flow chart of FIG. 5, operation of generating public information and making it public by the restoration center 20 will be more specifically described. With reference to FIG. 5, upon receiving the parameters 'n', 't', '$\alpha$', 'ID$_c$' and 's$_c$' distributed by the identification information management center 30 (Step 501), the data processing unit 21 of the restoration center 20 generates an arbitrary random number and takes the same as secret information 'r$_c$' (Step 502). Then, using the received secret key 's$_c$' and the secret information 'r$_c$', the center 20 generates public information 'X$_c$' according to the following expression (3) (Step 503).

$$X_c = s_c \cdot \alpha^{r_c} \bmod n \qquad (3)$$

Thereafter, the center 20 stores thus generated secret information 'r$_c$' in the secret information holding unit 22 (Step 504). The center also makes public the public information 'X$_c$' and the parameters 'n', 't', '$\alpha$' and 'ID$_c$' and distributes them to each user terminal system 10, as well as storing them in the public information holding unit 23 (Step 505).

The foregoing operation is that of the initialization phase. The session key restoration processing and the enciphered data decoding processing conducted by the restoration center 20 as the operation of the restoration phase will be described later. While in the above-described operation, the parameters 'n', 't', '$\alpha$' and 'ID$_c$' are made public by the restoration center 20, they may be made public by the identification information management center 30 and distributed to each user terminal system 10.

The user terminal system 10, which is implemented by a computer system such as a workstation or a personal computer, generates a session key based on a secret key dependent on the identification information 'ID$_i$' of the user terminal system 10 itself and based on the public information made public by the restoration center 20 and conducts data enciphering and decoding processing by using the session key. FIG. 2 is a block diagram showing structure of the user terminal system 10. With reference to FIG. 2, the user terminal system 10 includes a key generation unit 11 for generating a session key, a data processing unit 12 for conducting data enciphering processing and decoding processing by using a generated session key, a data storage unit 13 for storing enciphered data, a random number generation unit 14 for generating a random number for use in the generation of a session key, a secret key holding unit 15 for holding a secret key 's$_i$' received from the identification information management center 30, and a public information holding unit 16 for holding public information made public by the restoration center 20. In FIG. 2, illustration is made only of a characteristic part of the structure of the user terminal system 10 in the present embodiment and that of the remaining common part is omitted. It is clearly understood that the user terminal system 10 in practice includes a communication means for communicating with the restoration center 20 and the identification information management center 30, and other component.

Description will be next made of encryption key generation processing at the user terminal system 10 (i=A). As the initial state, it is assumed that a secret key 's$_A$' received from the identification information management center 30 is already stored in the secret key holding unit 15 and information 'X$_c$', 'n', 't', '$\alpha$' and 'ID$_c$' made public by the restoration center is already stored in the public information holding unit 16. The user terminal system 10(A) first generates a random number r by means of the random number generation unit 14. Then, the key generation unit 11 generates a session key 'K' according to the following expression (4) by using the secret key 'S$^A$' read from the secret key holding unit 15 and the public information 'X$_c$', 'n', 't', '$\alpha$' and 'ID$_c$' read from the public information holding unit 16.

$$K = (X_c^t \cdot ID_c)^r \bmod n \qquad (4)$$

The unit 11 also generates session key information '$Y_A$' according to the following expression (5).

$$Y_A = s_A \cdot \alpha^r \bmod n \quad (5)$$

Thereafter, the data processing unit 12 enciphers data 'M' by using thus generated session key 'K' to form a cryptography 'Z'. Then, the session key information '$Y_A$' and the cryptography 'Z' are together stored in the data storage unit 13. Hereafter, by using the session key K, the user terminal system 10(A) is allowed to decode data 'M' from the cryptography 'Z' at any time. The foregoing operation is that of the encryption phase.

Description will be next given of operation of restoring the session key 'K' of the user terminal system 10(A) by the restoration center 20 at the request of the user terminal system 10(A). Restoration of the session key 'K' is required, for example, in a case where the user terminal system 10(A) loses the session key 'K' or a case where the cryptography 'Z' held by the user terminal system 10(A) needs to be restored for the purpose of criminal investigation.

First, the session key information '$Y_A$' and the identification information '$ID_A$' of the user terminal system 10(A) are sent from the user terminal system 10(A) to the restoration center 20 to make a request for restoration of the session key 'K'. The user terminal system 10(A) is allowed to make a request for decoding of the cryptography 'Z' simultaneously with a request for restoration of the session key 'K'. When the restoration center 20 receives the request, the data processing unit 21 generates the session key 'K' according to the following expression (6) by using the session key information '$Y_A$' and the identification information '$ID_A$' received from the user terminal system 10(A) and the secret information '$r_c$' of the restoration center 20 read from the secret information holding unit 22.

$$K = (Y_A^t \cdot ID_A)^{r_c} \bmod n \quad (6)$$

Thereafter, the restoration center 20 returns the generated session key 'K' to the user terminal system 10(A) which has made a restoration request. When the request for decoding of the cryptography 'Z' has been made simultaneously with the request for restoration of the session key 'K', the center 20 decodes the cryptography 'Z' by using the generated session key 'K' and returns the session key 'K' and the decoded data 'M' to the user terminal system 10(A).

The foregoing operation is that of the restoration phase. As described above, generation of the session key 'K' by the restoration center 20 is conducted using the session key information '$Y_A$' and the identification information '$ID_A$' of the user terminal system 10(A). Therefore, even when a user terminal system 10(i=B), for example, requests restoration of the restoration center 20, saying by deceit that a session key or an cryptography of the user terminal system 10(A) is that of the user terminal system 10(B), the restoration center 20 tries to restore a session key by using the identification information '$ID_B$' of the user terminal system 10(B), so that a right session key can not be restored.

Thus, the present embodiment realizes a data recovery system which enables only a right user terminal system to restore its own data by using managed identification information. In addition, in the present embodiment, information to be managed in secret by the restoration center 20 is the secret information '$r_c$' of the restoration center 20 only and no information exists which is managed for each user terminal system as described in the foregoing. This makes application easy. Moreover, as to enciphered data whose decoding by others is not desired at any time, the user terminal system 10 can prevent restoration by the restoration center 20 by assigning none of session key information. This enables the user terminal system 10 to arbitrarily classify enciphered data into restorable data and non-restorable data. Also when public information unlawfully altered is used by mistake, a right session key can not be restored because session key information is dependent on the public information. The system of the present embodiment is therefore rigid in avoiding leakage of information even when public information is altered.

Second embodiment of the present invention will be described. According to the above-described first embodiment, by storing a session key, a user terminal system is allowed to decode data from cryptography by using the key. A session key, however, does not always have contents easy to remember. The present embodiment therefore intends to enable a user terminal system to set an arbitrary password as a session key in the encryption phase.

Figure 6:
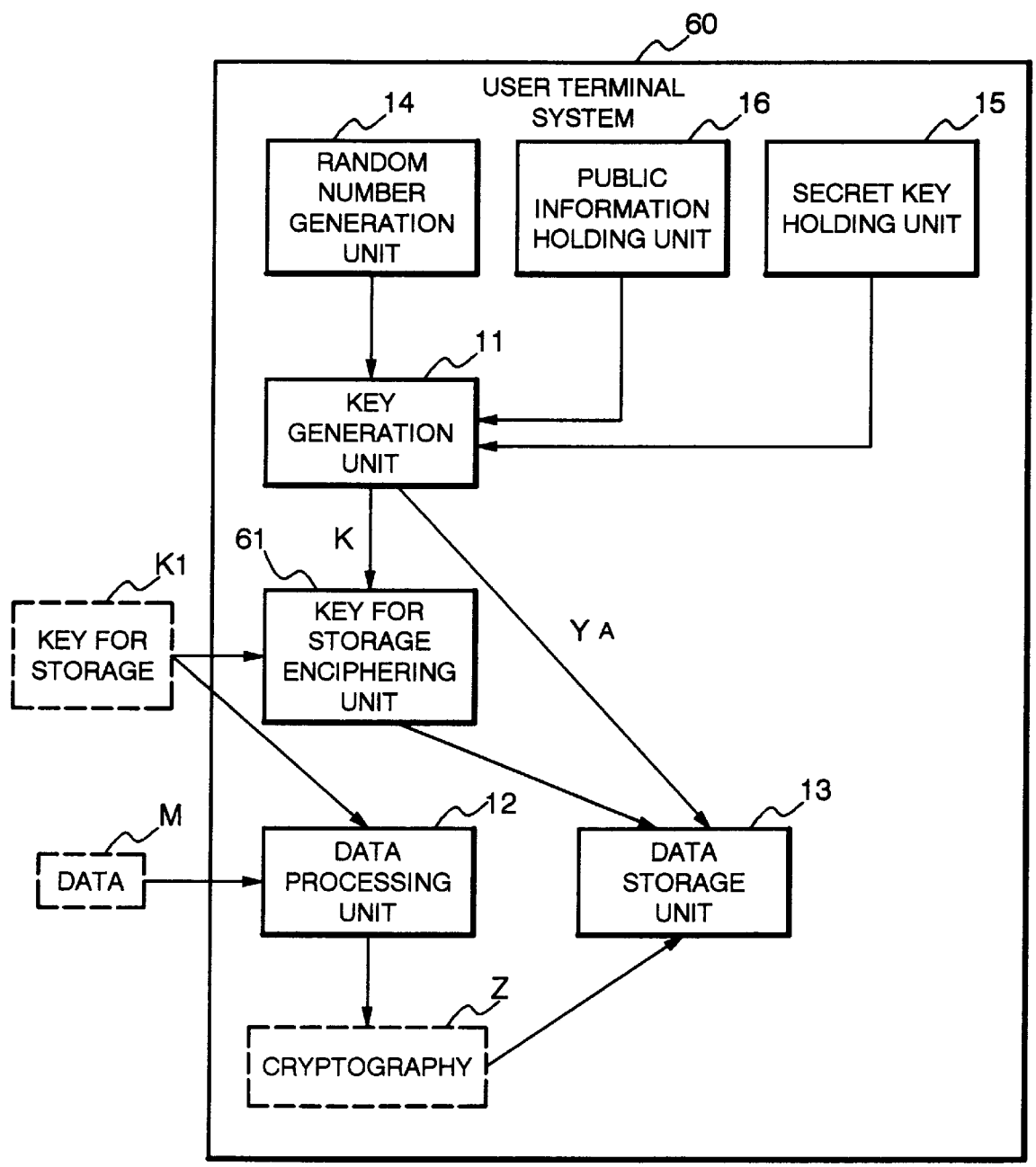
FIG. 6 is a block diagram showing structure of a user terminal system according to a second embodiment in which the encryption key processing system of the present invention is used in a data recovery system.

FIG. 6 is a block diagram showing structure of a user terminal system according to the present embodiment. With reference to FIG. 6, a user terminal system 60 includes a key generation unit 11 for generating a session key 'K', a key for storage enciphering unit 61 for enciphering a key for storage 'K1' preset by using the session key 'K', a data processing unit 12 for conducting data encryption processing and decoding processing by using the key for storage 'K1', a data storage unit 13 for storing enciphered data, a random number generation unit 14 for generating a random number for use in the generation of a session key, a secret key holding unit 15 for holding a secret key '$s_i$' received from the identification information management center 30, and a public information holding unit 16 for holding public information made public by the restoration center 20. In FIG. 6, illustration is made only of a characteristic part of the structure of the user terminal system 60 according to the present embodiment and that of the remaining common part is omitted. It is clearly understood that the user terminal system 60 in practice includes a communication means for communicating with the restoration center 20 and the identification information management center 30, and other component.

In the above-described structure, the key for storage enciphering unit 61 enciphers the key for storage 'K1' by using the session key 'K'. The unit 61 also generates key for storage information similar to the session key information '$Y_A$' generated for the session key 'K' by the key generation unit 11. The data processing unit 12 conducts encryption processing and decoding processing of the data 'M' by using the key for storage 'K1' enciphered by the key for storage enciphering unit 61. The data storage unit 13 stores the key for storage information generated by the key for storage enciphering unit 61 together with the cryptography 'Z' enciphered by the data processing unit 12 and the session key information '$Y_A$'. The remaining structure and operation of each component are the same as those of the user terminal system 10 according to the first embodiment shown in FIG. 2. Such arrangement, for example, allows the key for storage 'K1' to be an arbitrary password easy to remember, thereby eliminating the need of storing a random session key 'K'. In a case where a user terminal system forgets the key for storage 'K1' by any chance, since the session key 'K' can be restored by the restoration center 20, the key for storage 'K1' will be restored based on the session key 'K' and if necessary, enciphered data can be decoded.

Third embodiment of the present invention will be described. The present embodiment realizes encryption communication from a predetermined user terminal system (A) to other user terminal system(B).

Figure 7:
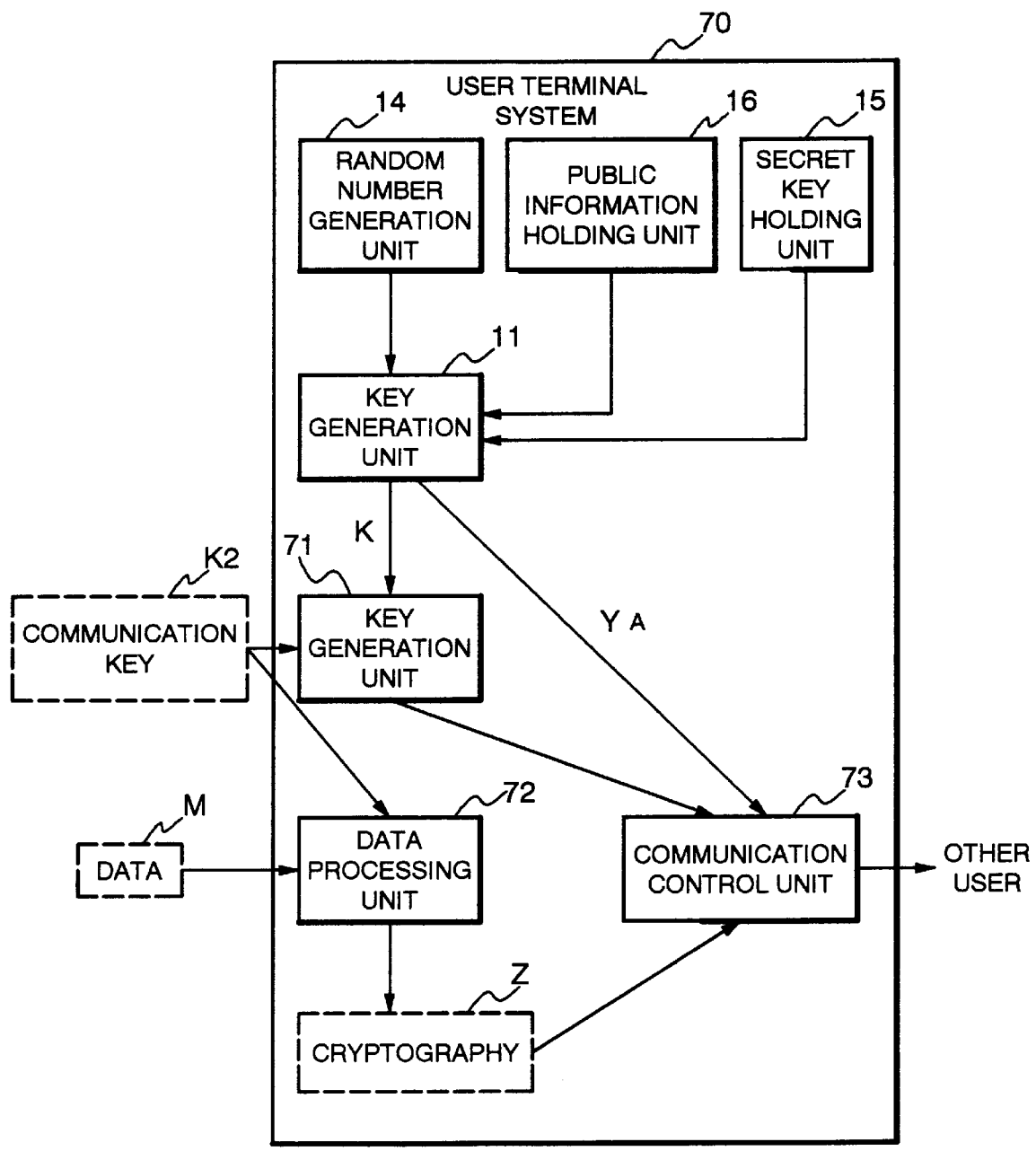
FIG. 7 is a block diagram showing structure of a user terminal system according to a third embodiment in which the encryption key processing system of the present invention is used in a data recovery system.

FIG. 7 is a block diagram showing structure of a user terminal system according to the present embodiment. With reference to FIG. 7, a user terminal system 70 includes a key generation unit 11 for generating a session key 'K', a communication key enciphering unit 71 for enciphering a communication key 'K2' for the encryption communication between user terminal systems 70(A) and (B) by using the session key 'K', a data processing unit 72 for conducting enciphering processing and decoding processing of a communication by using the communication key 'K2', a communication control unit 73 for conducting communication between the user terminal systems 70(A) and (B), a random number generation unit 14 for generating a random number for use in the generation of a session key, a secret key holding unit 15 for holding a secret key '$s_i$' received from the identification information management center 30, and a public information holding unit 16 for holding public information made public by the restoration center 20. In FIG. 7, illustration is made only of a characteristic part of the structure of the user terminal system 70 according to the present embodiment and that of the remaining common part is omitted. It is clearly understood that the user terminal system 70 in practice includes a communication means for communicating with the restoration center 20 and the identification information management center 30, and other component.

At the user terminal system 70(A), the communication key enciphering unit 71 enciphers a communication key 'K2' settled in advance between the user terminal systems 70(A) and (B) by using the session key 'K' generated by the key generation unit 11. The unit 71 also generates communication key information similar to session key information generated with respect to a session key by the key generation unit 11. The data processing unit 72 enciphers a communication 'N' by using the communication key 'K2' enciphered by the communication key enciphering unit 71 to generate an enciphered communication 'Z1'. The communication control unit 73 transmits the session key information '$Y_A$', the communication key information and the enciphered communication 'Z1' to the user terminal system 70(B). The remaining structure and operation of each component are the same as those of the user terminal system 10 according to the first embodiment shown in FIG. 2.

On the other hand, the user terminal system 70(B) is capable of decoding the communication 'N' from the cryptography 'Z1' by using the communication key 'K2' at the data processing unit 72. When the user terminal system loses the communication key 'K2', restoration is possible by telling the restoration center 20 that the cryptography is a communication from the user terminal system 70(A). Also when decipherment of a communication is necessary for criminal investigation or other purpose, restoration can be asked of the restoration center 20.

Fourth embodiment of the present invention will be described. In the present embodiment, secret information '$r_c$' of the restoration center is distributed to a plurality of management centers by using the distribution method of secret information.

Figure 8:
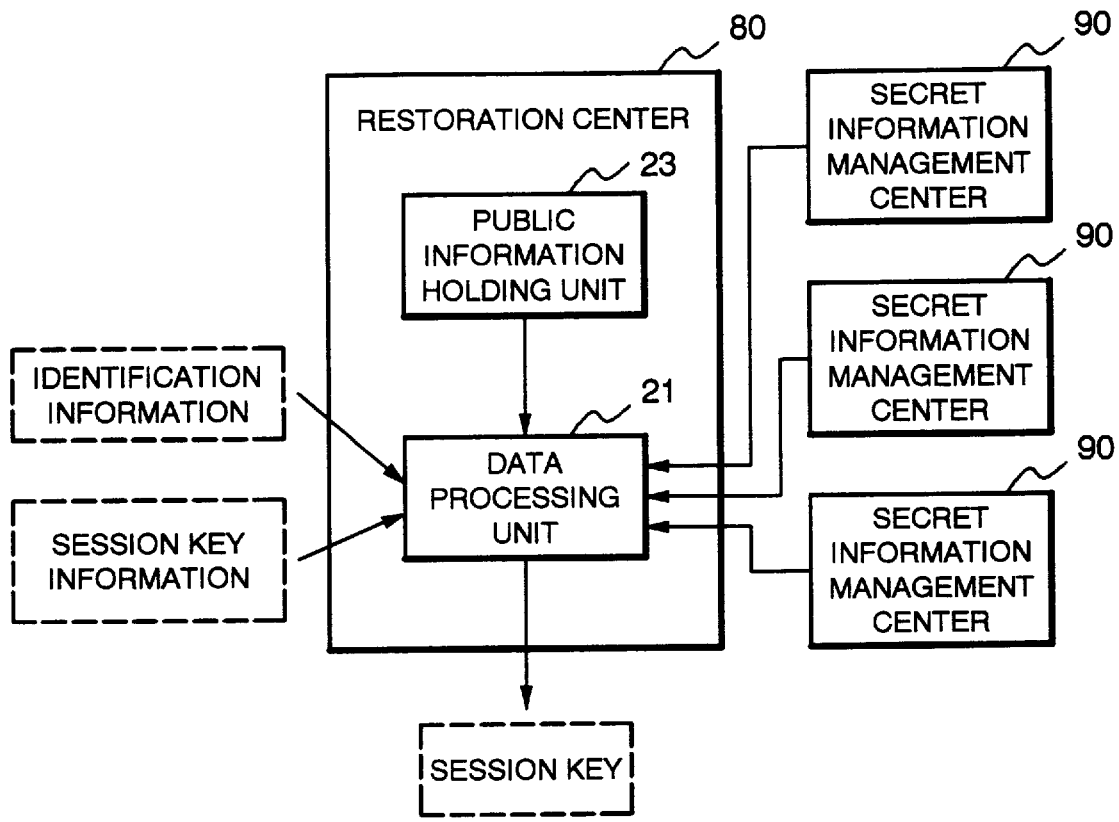
FIG. 8 is a block diagram showing structure of a restoration center according to a fourth embodiment in which the encryption key processing system of the present invention is used in a data recovery system.

FIG. 8 is block diagram showing structure of a restoration center according to the present embodiment. With reference to FIG. 8, a restoration center 80 includes a data processing unit 21 for generating public information and secret information inherent to the restoration center 20 which will be described later and conducting session key restoration and enciphered data decoding processing and a public information holding unit 23 for holding public information, and is connected to a plurality (three in the example shown in FIG. 8) of secret information management centers 90. In FIG. 8, illustration is made only of a characteristic part of the structure of the restoration center 80 according to the present embodiment and that of the remaining common part is omitted. It is clearly understood that the center 80 in practice includes a communication means for communicating with the user terminal system 10 and the identification information management center 30, and other component.

In the present embodiment, at the secret information management centers 90, secret information '$r_c$' of the restoration center 80 is dispersively stored. In the restoration phase, for restoring the session key 'K' by the restoration center 80, the restoration center 80 first collects and unifies information dispersively managed by the secret information management centers 90 to obtain secret information '$r_c$'. Then, using the secret information '$r_c$' and the identification information and the session key information of the user terminal system 10, the center 80 restores the session key. Concrete examples of the distribution method of secret information for use in the present embodiment are recited in abundance in common reference books on encryption techniques such as "Applied Cryptography" (Bruce Schneier, John Wiley & Sons, Inc.)

Although in the foregoing, the data recovery system of the present invention has been described with respect to four kinds of embodiments, it is apparent that these embodiments can be suitably combined to structure the system.

In the above-described data recovery systems, when a user terminal system loses a session key, the user terminal system asks the restoration center to restore the session key. In view of safety, there is a method of obtaining necessary information from the restoration center to restore a session key, but not asking other party than the user terminal system to restore a session key. Further safety can be achieved by providing a plurality of centers equivalent to the restoration center to dispersively manage information for use in the restoration of a session key. On the other hand, complicated procedures are desirably avoided of user's dividing his own secret key and lodging them to a plurality of consignees as in the conventional art recited in the above-described Article 1. In the following, description will be made of a key setting system employing the encryption key processing system of the present invention which meets such a demand as mentioned above.

The key setting system of the present invention is implemented by a sub-system for generating a secret key dependent on identification information of a user and key information, another sub-system for updating key information to issue public information corresponding to the key information, and a user for generating user secret information from user information delivered from each sub-system. Each sub-system is equivalent to the restoration center of the above-described data recovery system.

Figure 9:
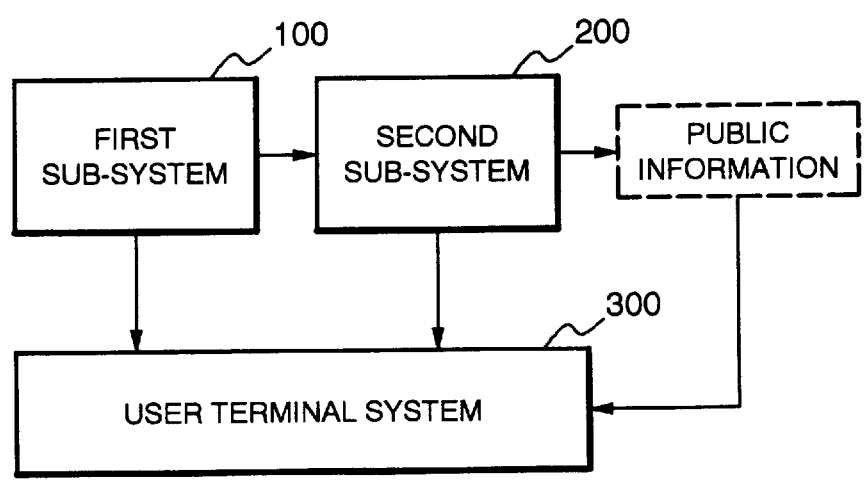
FIG. 9 is a block diagram showing a first embodiment in which the encryption key processing system of the present invention is used in a key setting system.

FIG. 9 is a block diagram showing structure of a key setting system according to one embodiment of the present invention. With reference to FIG. 9, the key system of the present embodiment includes a first sub-system 100 for generating a secret key and key information, a second sub-system 200 for updating key information and issuing public information, and a user terminal system 300. Although in FIG. 9, only one user terminal system 300 is illustrated, description will be made on the assumption that a plurality of the user terminal systems 300 ordinarily exist. In the following description, illustration of the user terminal system 300($i$) will individually indicate the plurality of the user terminal systems 300 for convenience.

Operation of the key setting system of the present embodiment includes three phases, preparation phase, key setting phase and restoration phase. The preparation phase is for the operation of setting a necessary parameter, which operation is conducted by the first sub-system 100. The key setting phase is for the operation of issuing a secret key, which operation is conducted by the sub-systems 100 and 200 and the user terminal system 300. The restoration phase is for the operation of restoring a session key generated based on a secret key, which operation is conducted by the sub-systems 100 and 200 and the user terminal system 300.

Figure 10:
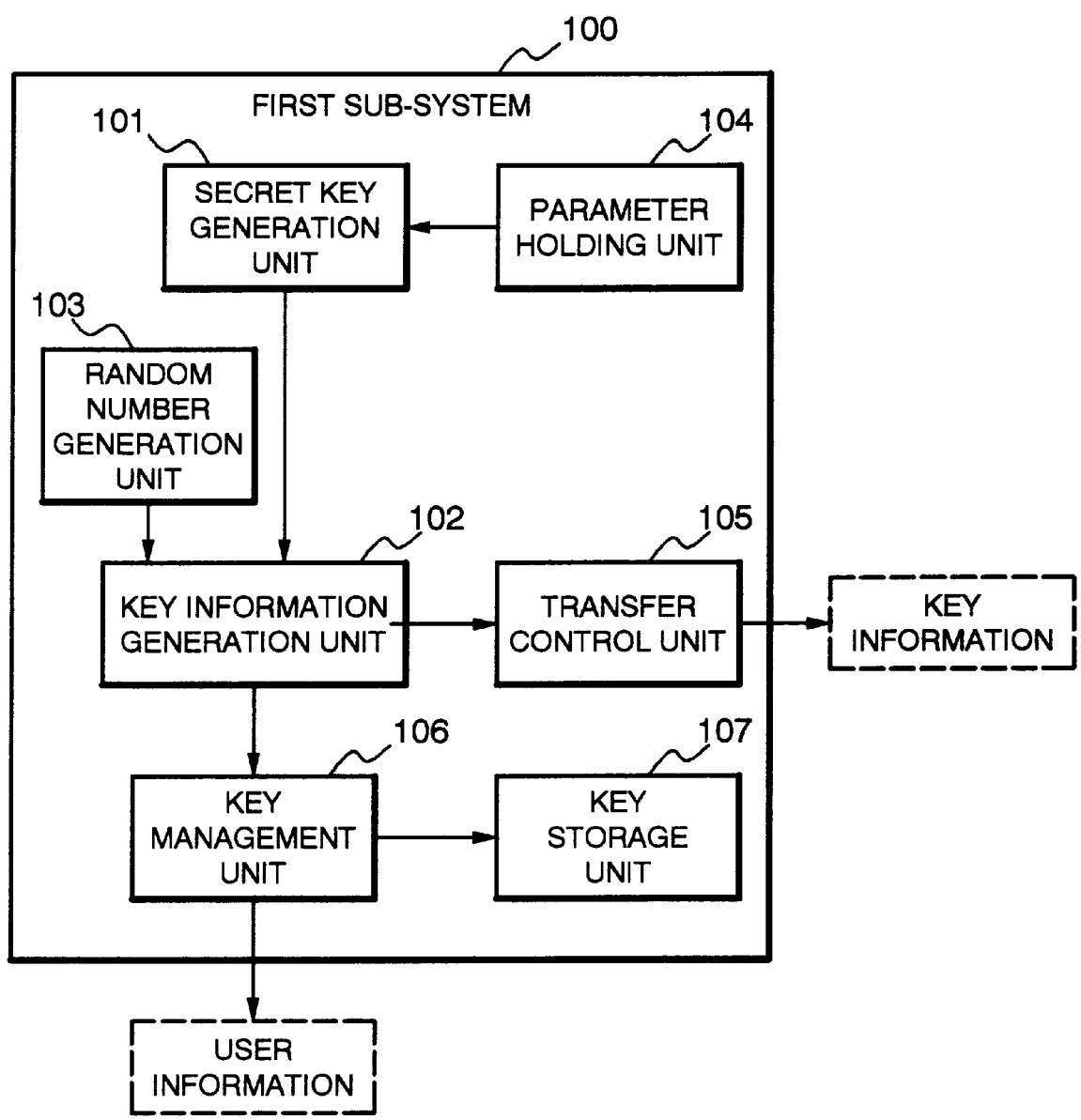
FIG. 10 is a block diagram showing structure of a first sub-system according to the present embodiment.

The first sub-system 100, which is implemented by a computer system such as a workstation or a personal computer, includes as shown in FIG. 10, a secret key generation unit 101 for generating a secret key, a key information generation unit 102 for generating key information corresponding to a generated secret key, a random number generation unit 103 for generating a random number necessary for generating key information, a parameter holding unit 104 for generating and holding a parameter necessary for generating a secret key and key information, a transfer control unit 105 for transmitting generated key information to the second sub-system 200, a key management unit 106 for sending user information including a generated secret key to the user terminal system 300, and a key storage unit 107 for storing part of user information as divisional secret information. In FIG. 10, illustration is made only of a characteristic part of the structure of the first sub-system 100 according to the present embodiment and that of the remaining common part is omitted.

Figure 13:
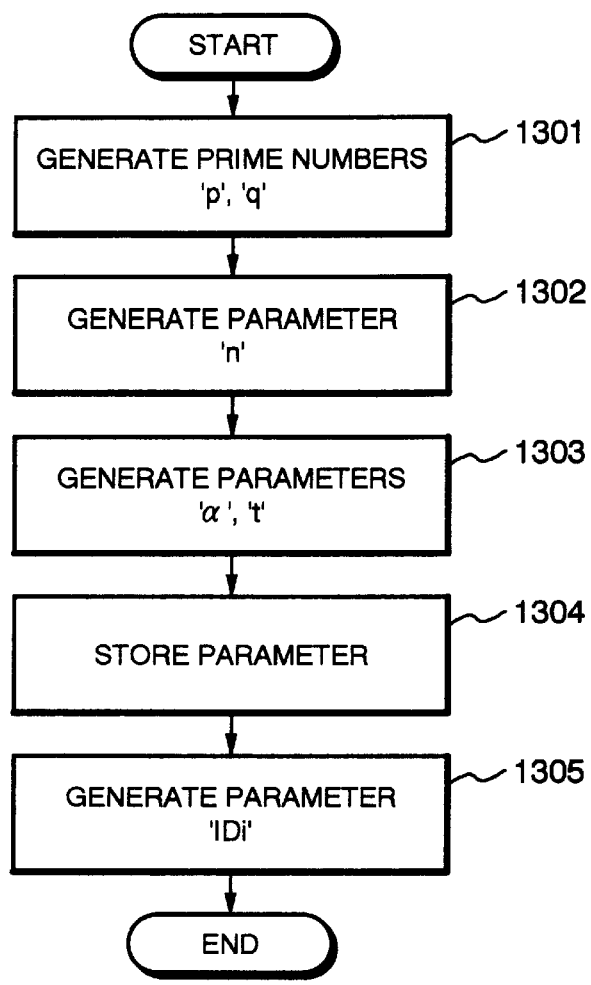
FIG. 13 is a flow chart showing operation of the first sub-system according to the present embodiment.

With reference to the flow chart shown in FIG. 13, operation of the preparation phase by the first sub-system 100 will be more specifically described. With reference to FIG. 13, the parameter holding unit 104 of the identification information management center 100 first selects large prime numbers 'p' and 'q' (Step 1301) to generate a parameter 'n(=p*q)' (Step 1302). Next, the system 100 selects a parameter 't' which is mutually prime with '(p-1)(q-1)' and a parameter 'α', a positive integer less than 'n' which will be a primitive element in GF(p) and GF(q) (Step 1303). Then, the system stores and holds the foregoing parameters 'p', 'q', 'n', 't' and 'α' (Step 1304). Lastly, the system 100 determines identification information '$ID_i$' for each user terminal system 300($i$) (Step 1305). Each identification information '$ID_i$' is set not to overlap with each other. Although in the present embodiment, the identification information '$ID_i$' is generated by the first sub-system 100, it may not necessarily be generated by the first sub-system 100 as long as each identification information '$ID_i$' is authorized to guarantee that they do not overlap with each other. For example, identification information '$ID_i$' may be set at each user terminal system 10 according to a predetermined rule.

Next, operation of the key setting phase by the first sub-system 100 will be described. First, the secret key generation unit 101 of the first sub-system 100 generates a secret key '$s_i$' of the user terminal system 300($i$) according to the following expression (7) by using identification information '$ID_i$' of the user terminal system 300($i$) and parameters 'p', 'q', 'n', 't' and 'α' read from the parameter holding unit 104.

$$s_i = (ID_i)^{-\frac{1}{t}} \bmod n \qquad (7)$$

Next, the random number generation unit 103 generates a random number '$r_1$' and the key information generating unit 102 generates key information '$Y_1$' according to the following expression (8) by using the random number '$r_1$' and the secret key '$s_i$'.

$$Y_1 = s_i \cdot \alpha^{r_1} \bmod n \qquad (8)$$

Then, the transfer control unit 105 sends the generated key information '$Y_1$' and the identification information '$ID_i$2 to the second sub-system 200. The key management unit 106 sends the parameters '$ID_i$', 'n', 't', 'α', '$s_i$' and '$r_1$' to the user terminal system 300($i$) in secret, and further, stores the random number '$r_1$' as the divisional secret information for the user terminal system 300($i$) in the key storage unit 107.

Figure 11:
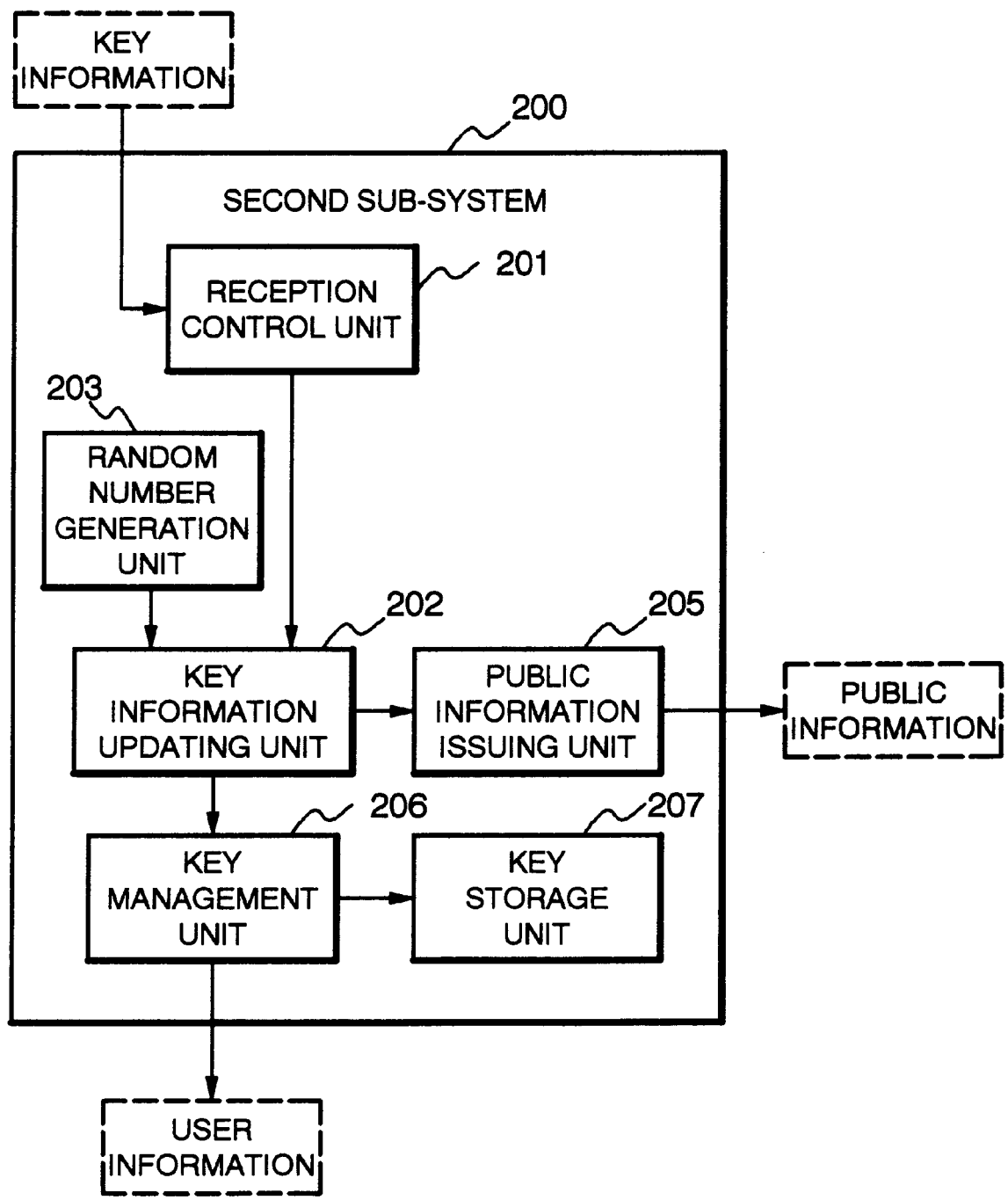
FIG. 11 is a block diagram showing structure of a second sub-system according to the present embodiment.

The second sub-system 200, which is implemented by a computer system such as a workstation or a personal computer, includes as shown in FIG. 11, a reception control unit 201 for receiving data transferred from the first sub-system 100, a key information updating unit 202 for updating key information received from the first sub-system, a random number generation unit 203 for generating a random number necessary for updating key information, a public information issuing unit 205 for issuing updated key information as public information, a key management unit 206 for sending user information to the user terminal system 300, and a key storage unit 207 for storing the user information as divisional secret information. In FIG. 11, illustration is made only of a characteristic part of the structure of the second sub-system 200 according to the present embodiment and that of the remaining common part is omitted.

Operation of the key setting phase by the second sub-system 200 will be described. First, when the reception control unit 201 of the second sub-system 200 accepts identification information '$ID_i$' and key information '$Y_1$' transmitted from the first sub-system 100, the random number generation unit 203 generates a random number '$r_2$' and the key information updating unit 202 updates the key information '$Y_1$' according to the following expression (9) by using the random number '$r_2$'.

$$Y_2 = Y_1 \cdot \alpha^{r_2} \bmod n \qquad (9)$$

Then, the public information issuing unit 205 issues the updated key information '$Y_2$' as public information regarding the user terminal system 300($i$). Next, the key management unit 206 transmits the random number '$r_2$' to the user terminal system 300($i$) in secret and stores the same as divisional secret information for the user terminal system 300($i$) in the key storage unit 207.

Figure 12:
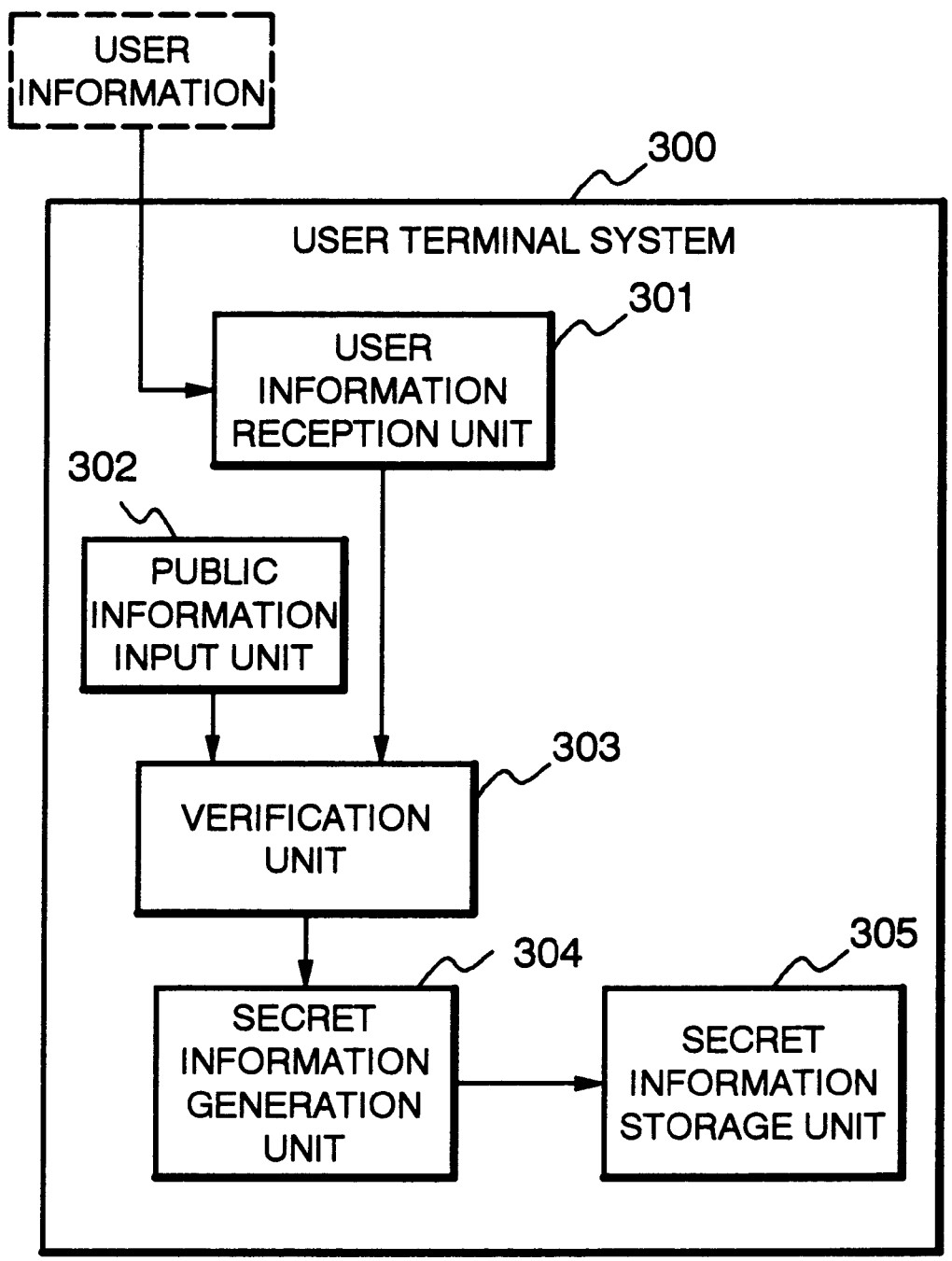
FIG. 12 is a block diagram showing structure of a user terminal system of the present embodiment.

The user terminal system 300, which is implemented by a computer system such as a workstation or a personal computer, includes as shown in FIG. 12, a user information reception unit 301 for receiving user information from the sub-systems 100 and 200, a public information input unit 302 for obtaining public information, a verification unit 303 for verifying whether user information and public information is valid, a secret information generation unit 304 for generating secret information based on verification results obtained by the verification unit 303, and a secret information storage unit 305 for storing generated secret information. In FIG. 12, illustration is made only of a characteristic part of the structure of the user terminal system 300 according to the present embodiment and that of the remaining common part is omitted.

Operation of the key setting phase by the user terminal system 300 will be described. First, when the user information reception unit 301 of the user terminal system 300($i$) receives a secret key '$s_i$' and secret information '$r_1$' from the first sub-system 100 and secret information '$r_2$' from the second sub-system 200, the public information input unit 302 receives input of public information '$Y_2$' issued from the second sub-system 200 and the verification unit 303 verifies whether these parameters satisfy the following expression (10).

$$\alpha^{r_1+r_2} = Y_2^t \cdot ID_i \bmod n \qquad (10)$$

When the above expression (10) is satisfied, the secret information generation unit 304 generates secret information '$s_i$' and '$r_1+r_2$' and stores the same in the secret information storage unit 305.

Using thus obtained secret information, a session key and other various encryption keys of the above-described recovery system can be generated. When a user terminal system 300(i=A) holds secret information '$s_A$' and '$r_A(=r_1+r_2)$', for example, a public key '$X_A$' of the user terminal system 300(A) will be represented by the following expression (11).

$$X_A = s_A \cdot \alpha^{r_A} \bmod n \qquad (11)$$

When a user terminal system 300(B) intends to encipher a message 'M' and send the enciphered message to the user terminal system 300(A), the user terminal system 300(B) generates a random number '$r_B$' and generates a session key 'K' and key information '$Y_B$' according to the following expressions (12) and (13) by using the random number '$r_B$' and its own secret key '$s_B$'

$$Y_B = s_B \cdot \alpha^{r_B} \bmod n \qquad (12)$$

$$K = (X_A^t ID_A)^{r_B} \bmod n \qquad (13)$$

Thereafter, the user terminal system 300(B) enciphers the message 'M' using the generated session key 'K' to generate a cryptography 'Z' and then transmits the key information '$Y_B$', the cryptography 'Z' and its own identification information '$ID_B$' all together to the user terminal system 300(A).

The user terminal system 300(A) generates a session key '$K_A$' according to the following expression (14) by using its own secret information '$r_A$'.

$$K_A = (Y_B^t \cdot ID_B)^{r_B} \bmod n \qquad (14)$$

Since $K_A = K$ holds in the above expression, decoding of the cryptography 'Z' by using the session key '$K_A$' results in obtaining the message 'M'.

Next, description will be made of operation of the restoration phase for restoring a session key in a case where the user terminal system 300(A) loses secret information '$r_A$' to be unable to generate a session key '$K_A$', or a case where the user terminal system loses the secret information '$r_A$' and accordingly needs to restore a message 'M' from a cryptography 'Z'. First, the user terminal system 300(A) or a party who intends to restore the message 'M' generates intermediate key information '$Z_0$' represented by the following expression (15) and sends the same to the first sub-system 100.

$$Z_0 = (Y_B^t \cdot ID_B) \bmod n \qquad (15)$$

Using the received intermediate key information '$Z_0$', the first sub-system 100 generates intermediate key information '$Z_1$' represented by the following expression (16) and sends the same to the second sub-system 200.

$$Z_1 = Z_0^{r_1} \bmod n \qquad (16)$$

Similarly, using the intermediate key information '$Z_1$' received from the first sub-system 100, the second sub-system 200 generates key information '$Z_2$' represented by the following expression (17) and sends the same to the user terminal system 300(A) or the party who intends to restore the message 'M'.

$$Z_2 = Z_0^{r_2} \bmod n \qquad (17)$$

By decoding the cryptography 'Z' by using the received key information '$Z_2$', the user terminal system 300(A) or the party who intends to restore the message 'M' is allowed to obtain the message 'M'.

Figure 14:
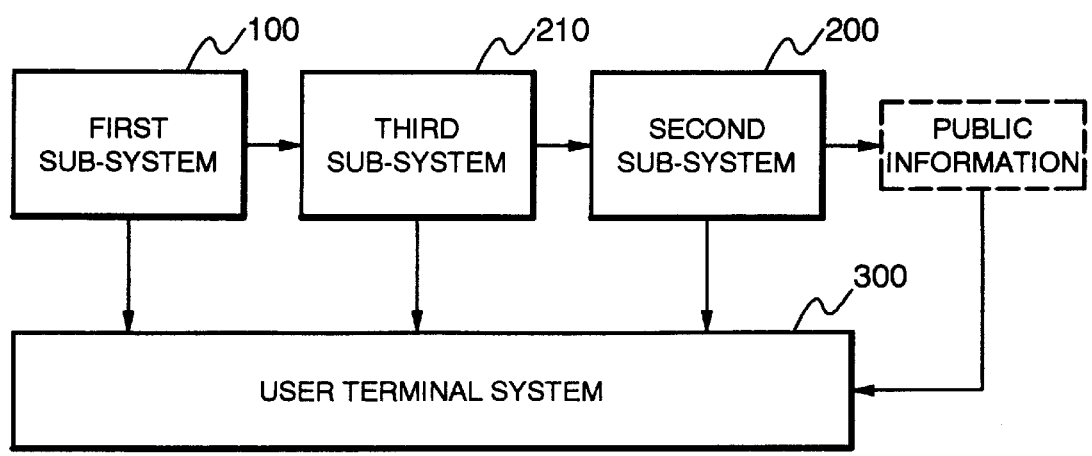
FIG. 14 is a block diagram showing a second embodiment in which the encryption key processing system of the present invention is used in a key setting system.

Although in the above-described embodiment, two subsystems, the first sub-system 100 and the second sub-system 200, are provided, a further sub-system for updating key information may be inserted between the first sub-system 100 and the second sub-system 200, so that secret information of the user terminal system 300 can be dispersively held by three or more sub-systems. FIG. 14 shows an example of structure of such a key setting system. With reference to FIG. 14, a third sub-system 210 is inserted between the first sub-system 100 and the second sub-system 200.

Figure 15:
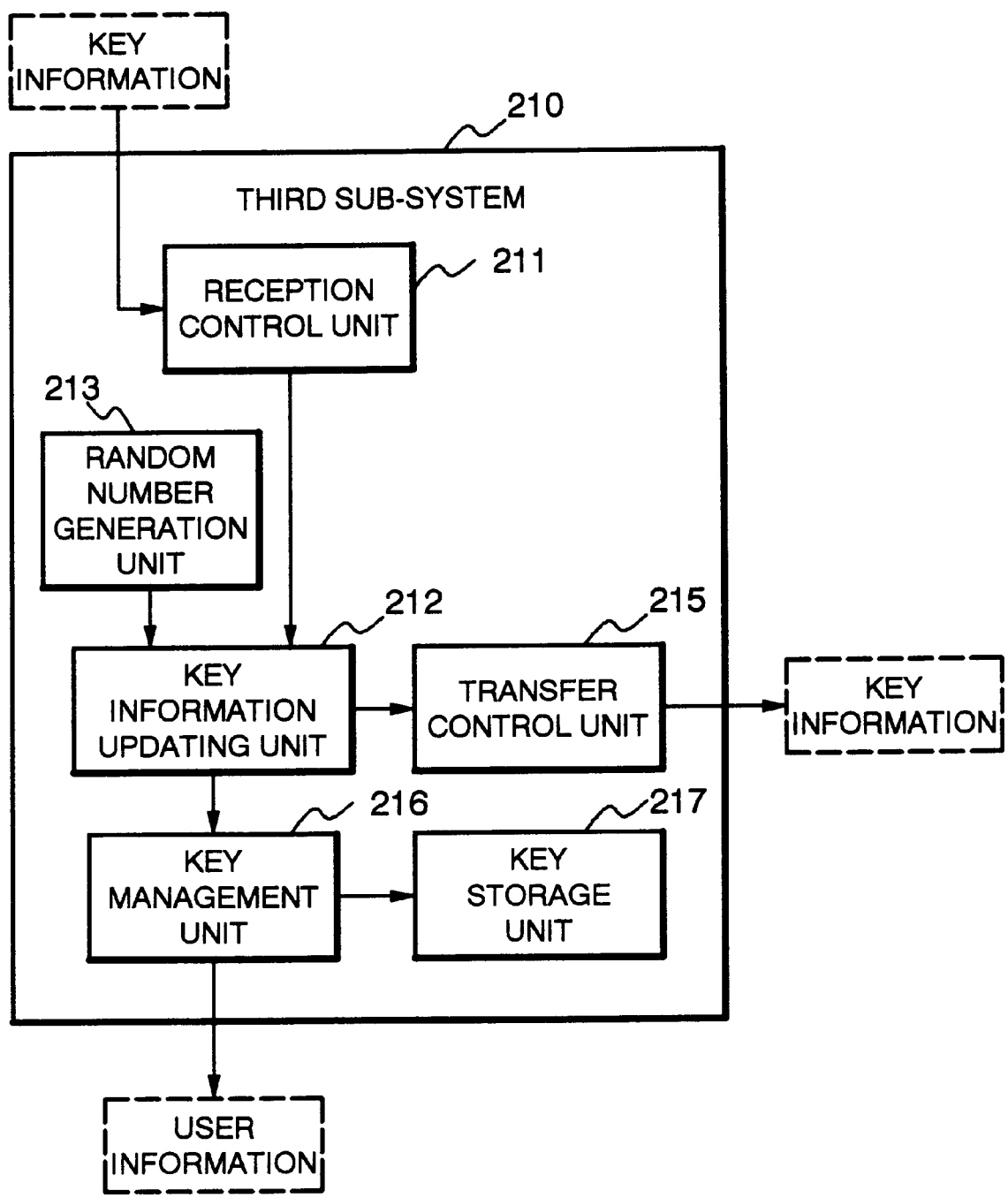
FIG. 15 is a block diagram showing structure of a third sub-system according to the present embodiment.

The third sub-system 210, which is implemented by a computer system such as a workstation or a personal computer, includes as shown in FIG. 15, a reception control unit 211 for receiving data transferred from the first sub-system 100, a key information updating unit 212 for updating key information received from the first sub-system, a random number generation unit 213 for generating a random number necessary for updating key information, a transfer control unit 215 for transmitting updated key information to the second sub-system 200, a key management unit 216 for sending user information to the user terminal system 300, and a key storage unit 217 for storing the user information as divisional secret information. In FIG. 15, illustration is made only of a characteristic part of the structure of the third sub-system 210 according to the present embodiment and that of the remaining common part is omitted.

Operation of the key setting phase by the third sub-system 210 will be described. First, when the reception control unit 211 of the third sub-system 210 accepts identification information '$ID_i$' and key information '$Y_1$' transmitted from the first sub-system 100, the random number generation unit 213 generates a random number '$r_2$' and the key information updating unit 212 updates the key information '$Y_1$' according to the above expression (9) by using the random number '$r_2$'. Then, the transfer control unit 215 sends the updated key information '$Y_2$' to the second sub-system 200. Next, the key management unit 216 sends the random number '$r_2$' to the user terminal system 300(i) in secret and stores the same as divisional secret information for the user terminal system 300(i) in the key storage unit 207.

The second sub-system 200 updates and makes public the key information '$Y_2$' sent from the third sub-system 210 and sends the secret information to the user terminal system 300(i). The user terminal system 300 verifies validity of the secret information sent from the respective sub-systems 100, 200 and 210 by using the following expression (18).

$$\alpha^{r_1+r_2+r_3} = Y_3^t \cdot ID_i \bmod n \qquad (18)$$

Then, the user terminal system 300 generates and stores secret information '$s_i$' and $r_1+r_2$.

Although in the present embodiment, one third subsystem is inserted between the first sub-system 100 and the second sub-system 200 as shown in FIG. 14, a plurality third sub-systems may be inserted. In this case, key information will be sequentially updated by the plurality of third subsystems, so that secret information will be dispersively held by all the sub-systems 100, 200 and 210. For managing public information, a further sub-system may be provided for taking charge of the management.

As described in the foregoing, since secret information managed by the restoration center is unified in the data recovery system using the encryption key processing system of the present invention, the number of management steps can be reduced. In addition, the system enables a restoration request from a false user to be excluded with ease based on identification information assigned in advance.

Moreover, simple processing of assigning or not assigning key information to cryptography allows each user terminal system to determine whether each data is recoverable.

The key setting system using the encryption key processing system of the present invention also enables a plurality of sub-systems each to generate and dispersively manage secret information of a user terminal system. Secret information issued to a user terminal system can be then regarded as having been lodged. The user terminal system therefore needs not newly follow lodging procedures.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An encryption key processing system for generating an encryption key for use in enciphering data, comprising:

a user terminal system which uses a key; and a sub-system for holding information regarding said user terminal system;

said sub-system generating predetermined public information, secret information corresponding to the public information and a secret key dependent on an identifier of said user terminal system and sending the secret key to said user terminal system in secret, and said user terminal system generating and using a key and necessary information based on said secret key and said public information received from said sub-system.

2. The encryption key processing system as set forth in claim 1, wherein said user terminal system comprises:

key generation means for generating a key and key information by using an appropriate random number, said secret key and said public information, data processing means for enciphering and decoding data by using a key generated by said key generation means, and storage means for storing key information generated by said key generation means and enciphered data enciphered by said data processing means together, and said sub-system comprises:

key restoration means for restoring a key of said user terminal system based on said key information, said secret information and an identifier of said user terminal system when necessary.

3. The encryption key processing system as set forth in claim 1, wherein said user terminal system comprises:

key generation means for generating a key and key information by using an appropriate random number, said secret key and said public information, encipherment means for enciphering a key for storage arbitrarily set by using a key generated by said key generation means, as well as generating information of the key for storage, data processing means for enciphering and decoding data by using a key for storage enciphered by said encipherment means, and storage means for storing key information generated by said key generation means, key for storage information generated by said encipherment means and enciphered data enciphered by said data processing means together, and said sub-system comprises:

key restoration means for restoring a key of said user terminal system based on said key information, said secret information and an identifier of said user terminal system when necessary.

4. The encryption key processing system as set forth in claim 1, wherein said user terminal system comprises:

key generation means for generating a key and key information by using an appropriate random number, said secret key and said public information, encipherment means for enciphering an encryption key for communication set for enciphering a communication between specific user terminal systems by using a key generated by said key generation means, as well as generating information of the encryption key for communication, data processing means for enciphering and decoding data by using a key for storage enciphered by said encipherment means, and storage means for storing key information generated by said key generation means, key for storage information generated by said encipherment means and enciphered data enciphered by said data processing means together, and said sub-system comprises:

key restoration means for restoring a key of said user terminal system based on said key information, said secret information and an identifier of said user terminal system when necessary.

5. The encryption key processing system as set forth in claim 1, further comprising a plurality of secret information holding sub-systems for dispersively holding said secret information generated by said sub-system, wherein said user terminal system comprises:

key generation means for generating a key and key information by using an appropriate random number, said secret key and said public information, data processing means for enciphering and decoding data by using a key generated by said key generation means, and storage means for storing key information generated by said key generation means and enciphered data enciphered by said data processing means together, and said sub-system comprises:

key restoration means for restoring a key of said user terminal system based on said key information, said secret information dispersively held by said plurality of secret information holding sub-systems and an identifier of said user terminal system when necessary.

6. The encryption key processing system as set forth in claim 1, wherein said sub-system comprises:

a first sub-system including means for generating said secret key, means for generating intermediate information for generating said public information and said secret information of its own system, and means for sending said secret information and said secret key to said user terminal system in secret, and a second sub-system including means for generating public information dependent on said intermediate information generated by said first sub-system and said secret information of its own system, mean for making said public information public, and means for sending said secret information to said user terminal system in secret, and said user terminal system comprises:

secret information generation means for generating user secret information for use in the generation of said key based on said secret information and said secret key generated by said first sub-system, said secret information generated by said second sub-system and said public information.

7. The encryption key processing system as set forth in claim 1, wherein said sub-system comprises:

a first sub-system including means for generating said secret key, means for generating intermediate information for generating said public information and said secret information of its own system, and means for sending said secret information and said secret key to said user terminal system in secret, and a second sub-system including means for generating public information dependent on said intermediate information generated by said first sub-system and said secret information of its own system, mean for making said public information public, and means for sending said secret information to said user terminal system in secret, and said user terminal system comprises:

secret information generation means for generating user secret information for use in the generation of said key based on said secret information and said secret key generated by said first sub-system, said secret information generated by said second sub-system and said public information, and wherein when necessary, said first sub-system processes intermediate key information dependent on an identifier of said user terminal system by using said secret information and said second sub-system processes said intermediate information processed by said first sub-system by using said secret information, thereby restoring said user secret information.

8. The encryption key processing system as set forth in claim 1, wherein said sub-system comprises:

a first sub-system including means for generating said secret key, means for generating intermediate information for generating said public information and said secret information of its own system, and means for sending said secret information and said secret key to said user terminal system in secret, a second sub-system including means for generating public information dependent on said intermediate information generated by said first sub-system and said secret information of its own system, mean for making said public information public, and means for sending said secret information to said user terminal system in secret, and a third sub-system inserted between said first sub-system and said second sub-system and including means for generating new intermediate information dependent on said intermediate information generated by said first sub-system and said secret information of its own system, and means for sending said secret information to said user terminal system in secret, said public information generation means of said second sub-system generating said public information based on new intermediate information generated by said third sub-system, and said user terminal system comprises:

secret information generation means for generating user secret information for use in the generation of said key based on said secret information and said secret key generated by said first sub-system, said secret information generated by said second sub-system and said public information.

9. The encryption key processing system as set forth in claim 8, wherein said third sub-systems are provided in plural and each generates new intermediate information based on intermediate information generated by an immediately preceding sub-system in a predetermined order, and said public information generation means of said second sub-system generates said public information based on new intermediate information generated by said third sub-system located immediately preceding to said second sub-system.

* * * * *